June 19, 1951  T. J. LEONARD  2,557,443
CULTIVATOR ATTACHMENT FOR TRACTORS
Filed Nov. 1, 1948  2 Sheets-Sheet 1
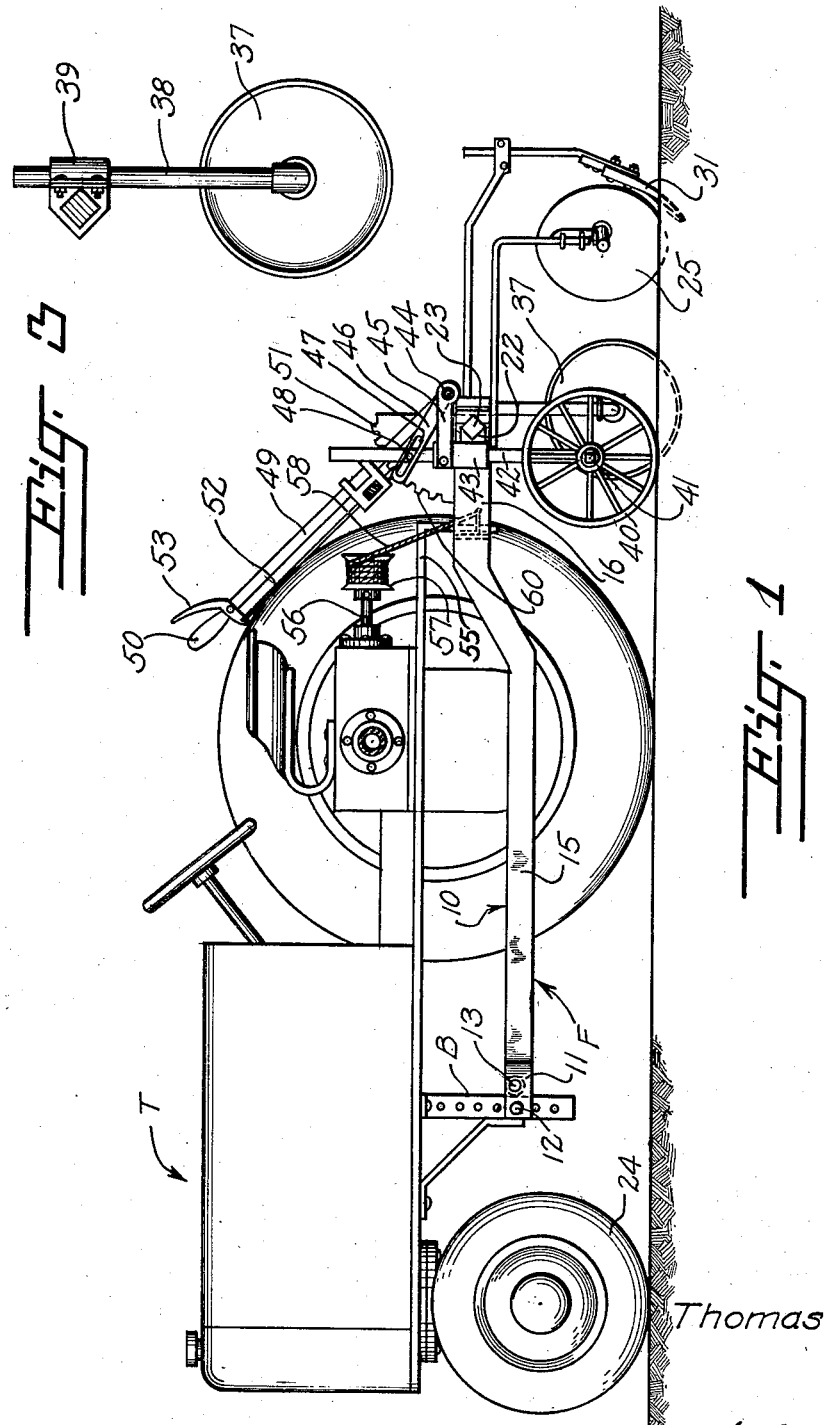
Inventor
Thomas J. Leonard
By Wilfred E. Lawson
ATTORNEY June 19, 1951 — T. J. LEONARD — 2,557,443
CULTIVATOR ATTACHMENT FOR TRACTORS
Filed Nov. 1, 1948 — 2 Sheets-Sheet 2
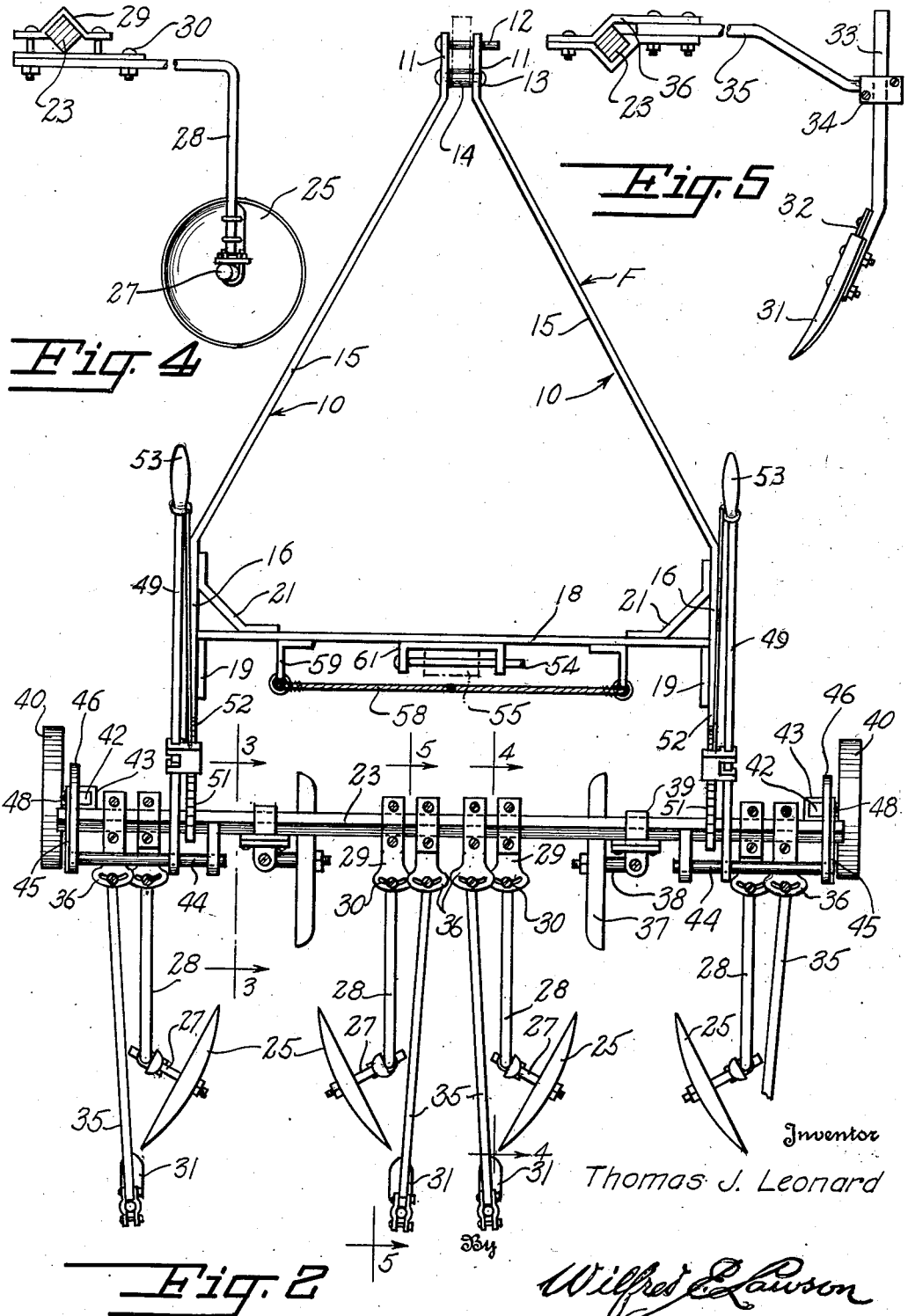

Patented June 19, 1951

2,557,443

UNITED STATES PATENT OFFICE 2,557,443

CULTIVATOR ATTACHMENT FOR TRACTORS

Thomas J. Leonard, Wakefield, Nebr.

Application November 1, 1948, Serial No. 57,651

1 Claim. (Cl. 97—47)

This invention relates to agricultural machinery, and more particularly to cultivators.

The primary object of the invention is to provide a cultivator adapted to be mounted directly onto a tractor instead of a tractor drawbar, thereby eliminating the driving difficulties inherent in the use of pull-type cultivators.

Another object of the invention is to provide a cultivator of the character indicated above wherein the control means are arranged handily.

A further object of the invention is to provide a cultivator of the character indicated above adapted to be lifted in its entirety off the ground while driving to or from the field and when turning at the end of a field.

An additional object of the invention is to provide a cultivator of the character indicated above which is adapted by the weight of the tractor and by a rigid frame to do better work than a conventional cultivator hitched to and pulled by the drawbar of a tractor.

Other objects and advantages will be apparent during the course of the following description.

In the accompanying drawings forming a part of this application, and in which like numerals are employed to designate like parts throughout the same:

Figure 1 is a side elevational view of the cultivator attached to a tractor according to the present invention;

Figure 2 is a top plan view of the cultivator according to the present invention;

Figure 3 is a sectional view taken on the line 3—3 of Figure 2;

Figure 4 is a sectional view taken on the line 4—4 of Figure 2;

Figure 5 is a sectional view taken on the line 5—5 of Figure 2.

Referring in detail to the drawings, the cultivator of the present invention comprises a frame F having two side bars 10. The front portions 11 of the two side bars extend parallel to each other, and a hitching pin 12 extends through said front portions adjacent the front ends thereof. Rearwardly of the hitching pin 12, a spacer pin 13 extends through the front end portions 11 of the side bars 10 and through a bushing 14, Figure 1, arranged between the said front end portions and spacing them at a desired distance from each other. From the rear end of each front end portion 11 an intermediate portion 15 of each side bar extends rearwardly and outwardly at an obtuse angle and the rear end portion 16 of each side bar 10 extends rearwardly from the rear end of the corresponding intermediate side bar portion 15. The rear end portions 16 are bent to incline upwardly so that the rear end side bar portions 16 are arranged at a higher level than the front end portions 11.

A transverse frame member 18 has at each of its ends an arm 19 extending rearwardly at right angles to said member and secured in any suitable conventional manner to the inside surfaces of the two rear end side bar portions 16. Reinforcing brackets 21 are secured to the front surface of the transverse frame member 18 and the inside surfaces of the side bar end portions 16.

The rear end of each of the said side bar end portions 16 is provided with a transverse right-angled groove 22, so that a transverse square mounting bar 23 can be located in these grooves.

The above-described frame F is adapted to be pivotally secured to a tractor T by means of the pivot pin 12, which extends pivotally through a suitable conventionally-constructed bracket B mounted underneath the tractor behind the front wheels 24 thereof.

The cultivator is adapted to cultivate two rows of crops simultaneously, and to accomplish this, a plurality of ground-engaging discs 25 are adjustably supported on the mounting bar 23. Each disc 25 is dependingly carried by a support member 27 which is secured to the lower end of an arm 28. The other end of the arm 28 is releasably secured to the square mounting bar 23 by means of a bracket 29. A screw 30 permits adjustment of the arm 28 in the bracket 29.

Coacting with each of the discs 25 is a shovel 31 which is carried by a clamp 32. The clamp 32 is connected to a shank 33 which is releasably held by a bracket 34 that is secured to the rear end of an arm 35. A support member 36 connects the other end of the arm 35 to the mounting bar 23.

For guiding the cultivator, a pair of bell wheels 37 are provided. The bell wheels 37 are each supported by the lower end of an arm 38, the upper end of the arm 38 being connected to the mounting bar 23 by means of a clamp 39.

Arranged on each side of the cultivator is a wheel 40 for controlling the depth of cutting of the discs and shovels. The wheels support the cultivator and the height of the cultivator above the wheels can be varied as desired.

To accomplish this, each wheel is rotatably mounted on a shaft 41 which is dependingly supported by a rod 42. The rod 42 is slidably arranged in a bracket 43 which is secured to side bar 15. A rotatable pipe 44 is supported by one end of a strap 45 which has its other end secured to the bracket 43. Secured to the pipe 44 is a bar 46 having a slot 47 therein for receiving a pin 48 which projects from the rod 42. An elongated arm 49 has its lower end secured to the pipe 44 for rotating the latter, there being a handle 50 on the upper end thereof. For locking wheel 40 in its adjusted positions, a sector-shaped plate 51 provided with a plurality of spaced notches 60 is arranged adjacent the arm 49 for receiving therein a portion of a rod 52 which is operatively connected to the arm 49. A grip 53 is connected to the rod 52 for moving the rod 52 out of engagement with the notches 60 so that the arm 49 can be pivoted to thereby vertically adjust the wheels 40.

A support member 61 is secured to the back of the transverse member 18 and carries a pin 54 which is adapted to engage an apertured brace 55 that is secured to the rear of the tractor for regulating the sway of the cultivator.

For raising and lowering the entire cultivator, a rotatable shaft 56 is operatively connected to and rotated by a source of power on the tractor. Mounted on the projecting end of the shaft 56 is a drum 57 having wound thereon a cable 58 which extends to suitable lugs 59 that are secured to transverse member 18.

In use, the cultivator is mounted directly on the tractor and can be raised and lowered by the cable 58 on the drum 57. The bell wheels 37, depth-control wheels 40, and disc and shovel brackets are all coupled to one straight square mounting bar 23. The controls for the cultivator are all handy to the driver. The cultivator is a two-row machine and is designed for high speed and ease in operation.

As many embodiments may be made of this inventive concept, and as many modifications may be made in the embodiment hereinbefore shown and described, it is to be understood that all matter herein is to be interpreted merely as illustrative and not in a limiting sense.

I claim:

A cultivator adapted to be attached to a tractor including a bracket mounted on the tractor rearwardly of the front wheels thereof, a frame pivotally attached to the bracket and extending rearwardly therefrom, underneath the tractor, a transverse mounting bar secured to the rear end of the frame, a plurality of earth working elements adjustable vertically relatively to said mounting bar, a bracket mounted adjacent each end of said bar, a rod slidable vertically in each of the last named brackets, an axle carried at the lower end of each of said rods, a ground wheel journalled on each of said axles, a shaft supported from and parallel to each of the opposite end portions of said bar, a slotted arm secured at one end to each of said shafts, a pin carried by each of said rods above the last named brackets and engaged in the slot of a complemental of said arms, and manually-operable means cooperative with each of said shafts for turning the same to affect the raising and lowering of said ground wheels to correspondingly raise and lower the rear end of said frame and the earth working elements carried thereby relatively to the ground.

THOMAS J. LEONARD.

REFERENCES CITED

The following references are of record in the file of this patent:

UNITED STATES PATENTS

| Number | Name | Date |
| --- | --- | --- |
| 1,448,991 | Bartholomew | Mar. 20, 1923 |
| 1,893,619 | Geraldson | Jan. 10, 1933 |
| 1,946,686 | Graham et al. | Feb. 13, 1934 |
| 2,339,225 | Strandlund | Jan. 11, 1944 |